Oct. 26, 1971   P. BLANKENBURG   3,615,124
APPARATUS FOR MARKING POINTS IN PHOTOGRAMS
Filed May 16, 1969   2 Sheets-Sheet 1

INVENTOR
PETER BLANKENBURG
BY: Molke & Molke
ATTORNEYS

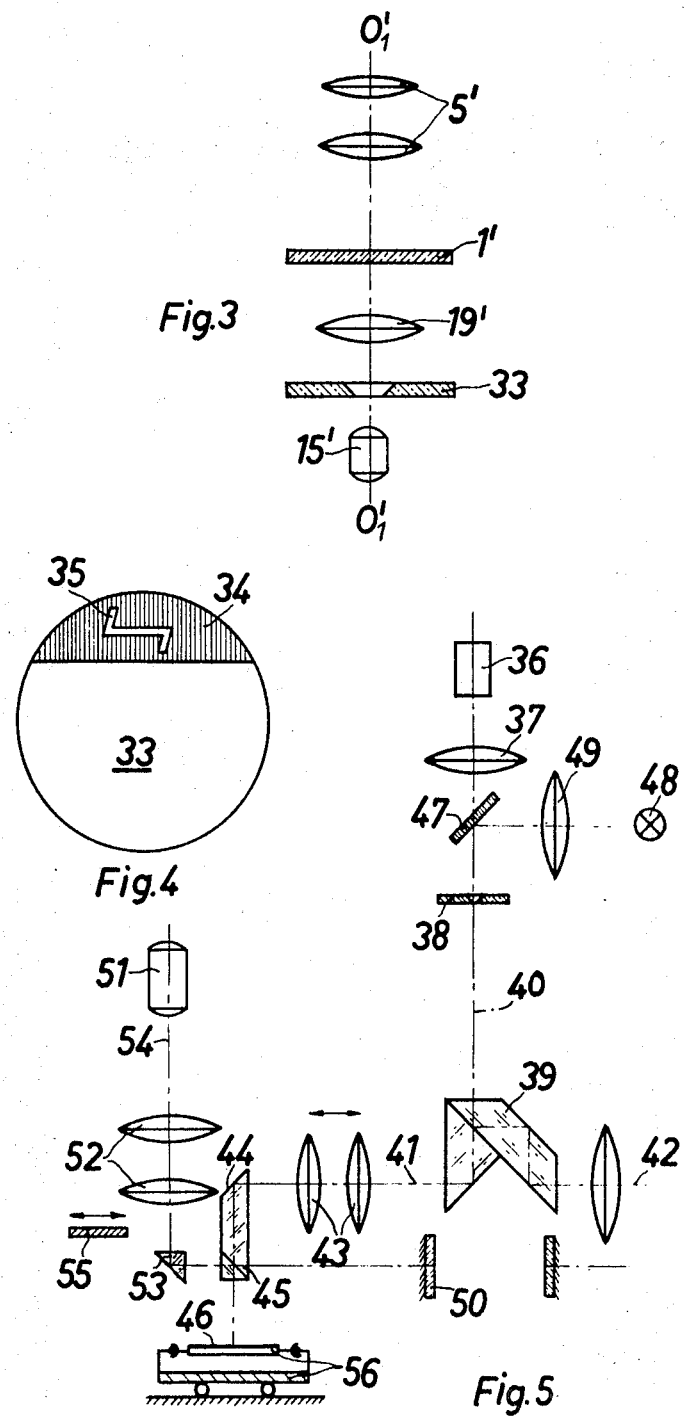

United States Patent Office 3,615,124
Patented Oct. 26, 1971

3,615,124
APPARATUS FOR MARKING POINTS IN
PHOTOGRAMS
Peter Blankenburg, Dresden, Germany, assignor to
Jenoptik Jena G.m.b.H., Jena, Germany
Filed May 16, 1969, Ser. No. 825,138
Claims priority, application Italy, May 16, 1968,
37,014/68
Int. Cl. G02b 27/32
U.S. Cl. 350—10
3 Claims

ABSTRACT OF THE DISCLOSURE

An apparatus for marking points in photograms by means of optical rays comprising a viewing system, a measuring system and a marking system. The optical rays and the observation ray-path traverse one and the same optical means. A diaphragm serves as measuring mark in the viewing system and the measuring system and serves at the same time as a ray-limiting means in the marking system.

The invention relates to apparatus for marking points in photograms by means of optical rays, wherein there is coordinated to each photogram, a radiation source for producing the optical rays, a measuring mark for identification of points, a device for illuminating the measuring mark, a device for viewing the photograms, and an optical system which comprises at least one ray-splitting prism so as to direct the optical rays to either the one photogram or the other and which projects the measuring mark into the plane of the photogram and serves for viewing this mark and the photogram. In the present specification, photograms are conceived as images for the marking of a point for photogrammetric purposes in a system of coordinates.

It is known practice to mark image points in single or stereoscopic images by means of optical rays of sufficient energy to remove at least the photographic layer of the image, or images, to a desired extent within a selected time interval. To this end the point to be marked is set by a viewing device coupled to the marking means and, subsequently thereto, marked on the photographic layer by acute exposure of this layer of the optical rays. This procedure has the disadvantage that unavoidable misadjustment in the setup of the apparatus prevents the marked point from covering accurately enough the point previously identified, particularly if the measuring mark and the optical element dwetermining the center of the marking ray beam do not correspond with each other.

The present invention aims at obviating this disadvantage by providing an apparatus for marking points in photograms, in which errors of adjustment inherent in the assemblage and set up of the various constructional elements of the apparatus are prevented from deviating the marked point from the previously identified point.

To this end, the present invention provides a diaphragm which serves as meausring mark and is located in an image plane containing both the marking ray beam and the illumating ray beam, so that the identified point and the marked point coincide with each other as long as the position of the optical system relative to the photogram remains unchanged during the time interval between identification and marking. Such a change is not however to be expected. If accurate identification and marking requires the positions of the measuring mark and the center of the marking beam to coincide with each other, the measuring-mark beam and the marking beam on the one hand and the observation beam on the other hand are only required to be so coupled with each other as to effect one and the same movement relative to the photogram. If the marking means and the viewing device are located on the same side of the photogram, it is advantageous to arrange that the optical axes of the marking beam, the illumination beam and the observation beam coincide with each other at least in the plane of the photogram. In this case it is advisable so as to construct the apparatus that a reflector is located in both the measuring-mark beam and the observation beam and that a beam splitter directs to the reflector part of the light illuminating the measuring mark. Advantageously, the observation beam contains a mark which is visible at least temporarily and, in case the radition source is an optical resonator of low pumping energy, indicates to the observer whether there is enough energy for marking. Such indication is ensured for example by the flashing up of the mark erased from the mirror coating of the reflector and diffusely illuminated in the rear. The beam illuminating the measuring mark and the beam used for marking can be combined by a physical ray fusing means or a tiltable mirror. A mirror ensures in convenient manner that either the illumination beam or the marking beam is effective, so that the observer's eyes are protected from injurious energy-bearing rays.

The apparatus according to the invention is suitable for identification and marking in both single photograms and stereophotograms.

In order that the invention may be more readily understood, reference is made to the accompanying drawings which illustrate diagrammatically and by way of example three embodiments of apparatus in accordance therewith, and in which FIG. 1 illustrates the optical elements of a first embodiment;

FIG. 3 illustrates that part of a second embodiment which differs from FIG. 1;

FIG. 4 is a top view of the diaphragm in FIG. 3; and

FIG. 5 illustrates a third embodiment, with one radiation source only.

Figure 1:
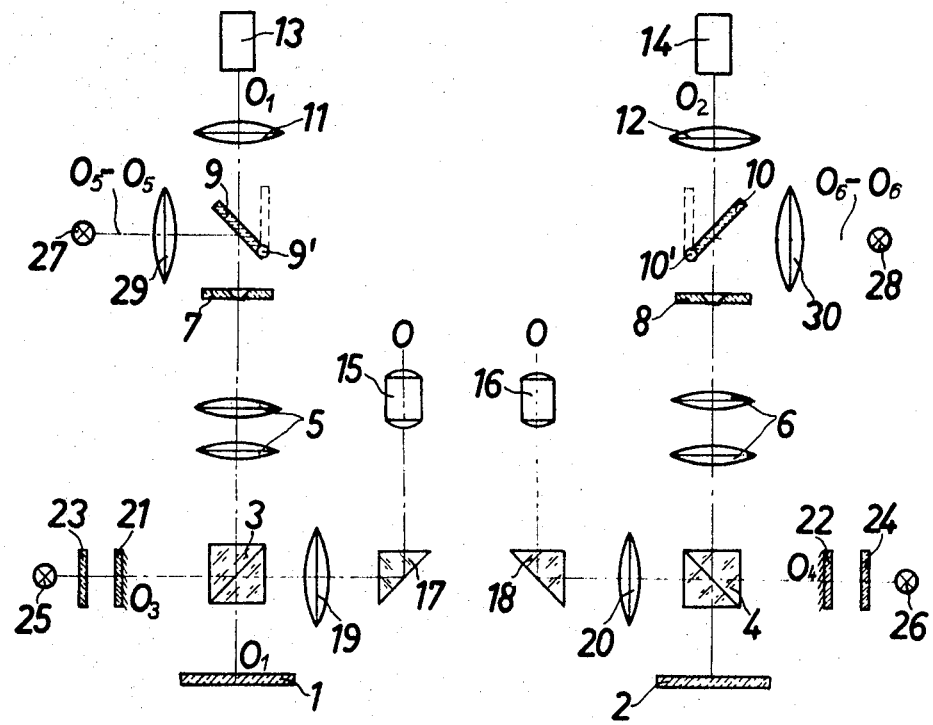

In FIG. 1 of the drawing, a photogram 1 is coordinated to one optical system and a photogram 2 is coordinated to another optical system, these two systems comprising respectively ray splitters in the form of cubes 3 and 4, imaging lens systems 5 and 6, perforated diaphragms 7 and 8, a mirror 9 tiltable about an axle 9' and a mirror 10 tiltable about an axle 10', objectives 11 and 12, and radiation sources 13 and 14. The imaging lenses 5 and the objective 11 have an optical axis $O_1$—$O_1$, and the imaging lenses 6 and the objective 12 have an optical axis $O_2$—$O_2$. The observation system for the one photogram has an optical axis $O_3$—$O_3$ and is made up of an eyepiece 15, a penta-prism 17, an objective 19, a beam-splitting cube 3, a reflector 21, a frosted glass plate 23 and a light-source 25. The observation system for the other photograms has an optical axis $O_4$—$O_4$ and is made up of an eyepiece 16, a pentaprisma 18, an objective 20, a beam-splitting cube 4, a reflector 22, a frosted glass plate 24, and a light-source 26. The illumination system for the one photogram has an optical axis $O_5$—$O_5$ and comprises a slight-soure 27, a condenser 29, and a mirror 9 tiltable about an axle 9'. The illumination system for the other photogram has an optical axis $O_6$—$O_6$ and comprises a light-source 28, a condenser 30, and a mirror 10 tiltable about an axle 10'. The axes $O_3$—$O_3$, $O_4$—$O_4$, $O_5$—$O_5$ and $O_6$—$O_6$ are at right angles to the axes $O_1$—$O_1$ and $O_2$—$O_2$.

Figure 2:
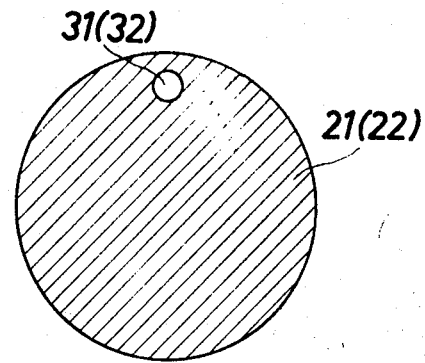
FIG. 2 is the reflector used in the embodiment of FIG. 1.

The perforated diaphragm 7 lies in the image plane of the objective 11 and the condenser 29, and the perforated diaphragm 8 lies in the image plane of the objective 12 and the condenser 30, the inclinations of the mirrors 9 and 10 determining which of the two systems is operative. The mirrors 9 and 10 are respectively tiltable in such a manner that the light-source 27 and the condenser 29 produce an image near the axis $O_1$—$O_1$ on the perforated diaphragm 7 and that the light-source 28 and the condenser 30 produce an image near the axis $O_2$—$O_2$ on the perforated diaphragm 8. The diaphragms 7 and 8 lie in a common plane into which the imaging lenses 5 and the cube 3 optically conjugate the planes respectively containing the photogram 1 and the reflector 21, and into which the imaging lenses 6 and the cube 4 optically conjugate the planes respectively containing the photogram 2 and the reflector 22. The light from the light-source 27 and the diaphragm 7 is transmitted by the cube 3 in part to the photogram 1 and in part to the reflector 21. The light from the light-source 28 and the diaphragm 8 is transmitted by the cube 4 in part to the photogram 2 and in part to the reflector 22. The photogram 1 and the reflector 21 lie in the object-side focal plane of and are at the same distance from the objective 19. The photogram 2 and the reflector 22 lie in the object-side focal plane of and are at the same distance from the objective 20. In consequence thereof, both the plane of the reflector and the plane of the photogram are visible with great accuracy through the eyepieces 15 and 16. There is also a uniformly bright view of the measuring marks produced by the reflectors 21 and 22. The brightness of these marks is not influenced by fluctuations in the brightness of the respective details in the photogram. The light-source 25 and the frosted glass plate 23 diffusely illuminate a mark 31 of the reflector 21 (FIG. 2). The light source 26 an dthe frosted glass plate 24 diffusely illuminate a mark 32 of the reflector 22 (FIG. 2). Illumination takes place when the radiation intensity of the sources 13 and 14 is great enough. For operation, the apparatus is adjusted relatively to the photograms 1 and 2 or, in other words, a stereoscopic pair of point images is brought into coincidence with the measuring mark, which is the image of the diaphragm 7 (8) in the plane of the reflector 21 (22) and, accordingly, the photogram 1 (2). When the mark 31 (32) of the reflector 21 (22) brightens up, the mirror 9 (10) is tilted into the position indicated in FIG. 1 by broken lines, so that the source 13 (14) irradiates the photogram 1 (2) for a short period, and the mirror 9 (10) is tilted back into its original position. Thereupon, the process of point identification and marking can be repeated.

By using only one side of the apparatus of FIG. 1, markings can be produced also in single images, instead of in pairs of stereoscopic images.

In the embodiment illustrated in FIG. 3, the radiation device and the illumination device have the same positions as in FIG. 1, whereas the observation device 15', 19' is located on the other side of the photogram 1'. This arrangement is advantageous where highly translucent photograms are marked. The numeral 5' designates the lenses for imaging the radiation system and the illumination system, and the numeral 33 designates a diaphragm which lies in the object plane of the eyepiece 15' and has a mark 35 (FIG. 4) in a surrounding dark field 34 for signalling sufficiency of radiation intensity. The mark 35 and surrounding 34 can naturally be dispensed with if the radiation source is of sufficiently high intensity at any desired instant. In all other respects, the embodiment illustrated in FIG. 3 can have the same construction as the apparatus of FIG. 1 or that of FIG. 5 presently to be described.

In the embodiment illustrated in FIG. 5, the exit aperture of a high-intensity radiation source 36 lies in the object plane of an objective 37, with which a perforated diaphragm 38 in the conjugate image plane is associated. A ray-splitting prism 39 divides the beam 40 (only central ray shown) from the diaphragm 38 into two symmetrical partial beams 41 and 42 (only central ray of beam 41 shown completely). The partial beam 41 traverses imaging lenses 43 and a prism 44 having a splitting face 45. The lenses 43, which image the diaphragm 38 in the plane of a photogram 46, are displaceable for focussing along the directions of an arrow shown near them in the drawing.

In the beam 40, a semi-transparent mirror 47 is located between the objective 37 and the diaphragm 38. A light-source 48, a condenser 49, and a mirror 47 illuminate the diaphragm 38 for producing a measuring mark. The lenses 43, the prism 44 and the splitting face 45 image the illuminated diaphragm 38 on the reflector 50, where the image can be viewed together with the photogram 46 through an observation system comprising an eyepiece 51, an objective 52, and a deviating prism 53. The light-source 48 and the radiation source 36 operate alternately. A diaphragm 55 can be inserted into the beam 54 along the direction of an arrow shown near it, so as to protect the observer's eyes while the radiation source 36 operates for marking. The efficacy of the radiation source is controlled by known electromechanical means (not shown).

The photogram 46 is mounted on cross slides 56 for motion relative to the partial beam 41. It is naturally possible to use two single slides, one for displacing the photogram 46 in one direction and the other for displacing the partial beam 41 in the other.

Apart from the high-intensity radiation source 36 requiring no signal indicating readiness for marking, the mode of operation of the embodiment shown in FIG. 5 corresponds to that of the embodiment described with reference to FIG. 1.

I claim:
1. An apparatus for marking points in photograms comprising
   a viewing system made up of at least one first objective and an eyepiece,
      said first objective and said eyepiece having a common optical axis which is substantially at right angles to the photograms,
      the photograms lying in the object-side focal plane of said first objective,
   at least one light-source optically aligned with the photograms,
   a condenser imaging said light-source in a plane at right angles to its optical axis,
   at least one radiation source emitting parallel optical rays and optically aligned with the photograms,
   a second objective focussing said rays in said plane,
      the optical axis of said condenser and the optical axis of said second objective coinciding at least near said plane,
   an optical means for combining and rectifying the optical axis of said second objective and the optical axis of said condenser,
   a diaphragm in said plane and on the combined rectified optical axes of said condenser and said second objective, and
   an imaging system on said combined rectified optical axes,
      said imaging system imaging said diaphragm on the photograms,
      said common optical axis and said recified optical axes coinciding at least near the photograms, the photograms and the image of said diaphragm being viewed through said viewing system.

2. An apparatus as claimed in claim 1, wherein
a first reflector combines the viewing ray-path with the illumination and marking ray-paths and also separates part of said illumination ray-path,
   said first reflector being located between said imaging system and said photograms and being traversed by said combined rectified optical axes, and
wherein said first rector includes a semi-transparent optical face inclined 45° relatively to the optical axes in all ray paths, and
wherein a second reflector in the separated part of the illumination ray-path is located at right angles to the optical axis thereof and serves for the reflection of the separated part of the illumination ray-path into said viewing system.

3. An apparatus as claimed in claim 2, characterized by a mark which is visible at least temporarily and so located in the observation ray-path as to be at a distance from the center of the field of vision.

References Cited

UNITED STATES PATENTS

| | | | |
|---|---|---|---|
| 2,423,370 | 7/1947 | Butscher | 350—33 X |
| 3,096,767 | 7/1963 | Gresser et al. | 350—91 UX |
| 3,490,829 | 1/1970 | Weibrecht | 350—10 X |

DAVID SCHONBERG, Primary Examiner

T. H. KUSMER, Assistant Examiner

U.C. Cl. X.R.

350—30, 33, 91